United States Patent
Lee et al.

(10) Patent No.: US 9,418,789 B2
(45) Date of Patent: Aug. 16, 2016

(54) MULTILAYER CERAMIC ELECTRONIC COMPONENT

(71) Applicant: SAMSUNG ELECTRO-MECHANICS CO., LTD., Suwon-Si, Gyeonggi-Do (KR)

(72) Inventors: Jong Ho Lee, Suwon-Si (KR); Hang Kyu Cho, Suwon-Si (KR); Doo Young Kim, Suwon-Si (KR); Chung Eun Lee, Suwon-Si (KR); Chul Seung Lee, Suwon-Si (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 108 days.

(21) Appl. No.: 14/335,674

(22) Filed: Jul. 18, 2014

(65) Prior Publication Data

US 2015/0318110 A1    Nov. 5, 2015

(30) Foreign Application Priority Data

Apr. 30, 2014    (KR) .................. 10-2014-0052537

(51) Int. Cl.
| | |
|---|---|
| *H01G 4/30* | (2006.01) |
| *H01G 4/012* | (2006.01) |
| *H01G 4/12* | (2006.01) |
| *H01G 4/232* | (2006.01) |

(52) U.S. Cl.
CPC .................. *H01G 4/012* (2013.01); *H01G 4/30* (2013.01); *H01G 4/12* (2013.01); *H01G 4/232* (2013.01)

(58) Field of Classification Search
CPC ........... H01G 4/30; H01G 4/005; H01G 4/01; H01G 4/012
See application file for complete search history.

(56) References Cited

U.S. PATENT DOCUMENTS

| | | | |
|---|---|---|---|
| 2006/0203420 A1* | 9/2006 | Okuyama | H01G 4/232 361/271 |
| 2008/0084651 A1 | 4/2008 | Oguni et al. | |
| 2011/0056735 A1 | 3/2011 | Lee et al. | |
| 2013/0062994 A1* | 3/2013 | Ogawa | H01F 17/0013 310/311 |
| 2013/0241361 A1* | 9/2013 | Lee | H01G 4/30 310/366 |
| 2014/0290998 A1* | 10/2014 | Ahn | H01G 4/30 174/260 |

FOREIGN PATENT DOCUMENTS

| | | |
|---|---|---|
| JP | 2007-13132 A | 1/2007 |
| JP | 2013-093374 A | 5/2013 |
| KR | 10-1069989 B1 | 9/2011 |

* cited by examiner

*Primary Examiner* — Dion R Ferguson
(74) *Attorney, Agent, or Firm* — McDermott Will & Emery LLP

(57) ABSTRACT

A multilayer ceramic electronic component may include: a ceramic body including an active part in which dielectric layers and internal electrodes are alternately disposed, an upper cover part disposed on an upper portion of the active part, and a lower cover part disposed on a lower portion thereof; a first dummy electrode disposed between a central portion of the upper or lower cover part in a length direction and one end surface of the cover part in the length direction; and a second dummy electrode disposed between the central portion of the upper or lower cover part in the length direction and the other end surface of the cover part in the length direction, and spaced apart from the first dummy electrode.

10 Claims, 2 Drawing Sheets

A-A'

MULTILAYER CERAMIC ELECTRONIC COMPONENT

CROSS-REFERENCE TO RELATED APPLICATION

This application claims the benefit of Korean Patent Application No. 10-2014-0052537 filed on Apr. 30, 2014, with the Korean Intellectual Property Office, the disclosure of which is incorporated herein by reference.

BACKGROUND

The present disclosure relates to a multilayer ceramic electronic component.

Generally, electronic components using ceramic materials, such as capacitors, inductors, piezoelectric elements, varistors, thermistors, and the like, include a ceramic body formed of a ceramic material, internal electrodes formed in the ceramic body, and external electrodes formed on surfaces of the ceramic body to be connected to the internal electrodes.

In accordance with the electronization of various functions in applications requiring high degrees of reliability and increases in demands thereon, in response thereto, demands also have been made for multilayer ceramic electronic components having high reliability.

As factors causing degradation in reliability, crack generation, delamination, breakdown voltage characteristics, and the like may be present, and residual carbon existing in a ceramic body of the multilayer ceramic electronic component may also affect reliability of the multilayer ceramic electronic component. Therefore, in order to improve reliability of the multilayer ceramic electronic component, an amount of the residual carbon in the ceramic body needs to be decreased.

RELATED ART DOCUMENT (Patent Document 1) Korean Patent Publication No. 10-1069989

SUMMARY

An exemplary embodiment in the present disclosure may provide a multilayer ceramic electronic component.

According to an exemplary embodiment in the present disclosure, a multilayer ceramic electronic component may include an active part in which dielectric layers and internal electrodes are alternately disposed, and upper and lower cover parts including a residual carbon discharging portion formed therein.

The residual carbon discharging portion may be formed of a dummy electrode, wherein the dummy electrode may include a first dummy electrode disposed in one portion of the ceramic body in a length direction and a second dummy electrode disposed in the other portion of the ceramic body in the length direction.

According to an exemplary embodiment of the present disclosure, when an interval between dummy electrodes adjacent to each other in a thickness direction or a distance from an outermost dummy electrode to an upper or lower surface of the ceramic body adjacent thereto is defined as C, and a thickness of the ceramic body is defined as T1, $0.03 \leq C/T1 \leq 0.15$ may be satisfied.

According to an exemplary embodiment of the present disclosure, when a length of the ceramic body is defined as L1, and a length of a gap between the first and second dummy electrodes is defined as G, $0.01 \leq G/L1 \leq 0.2$ may be satisfied.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
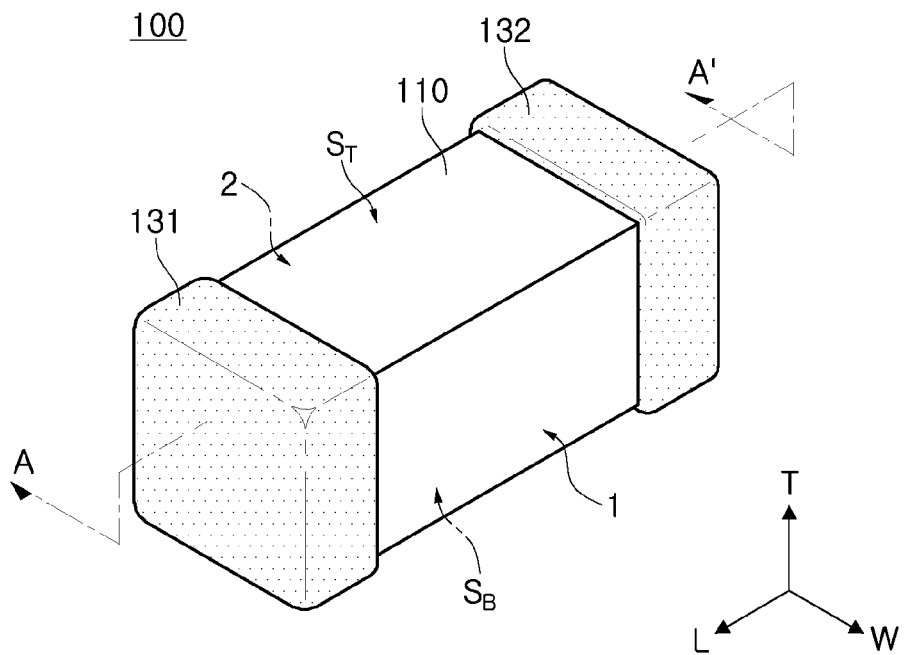
FIG. 1 is a perspective view showing a multilayer ceramic electronic component according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

Figure 2:
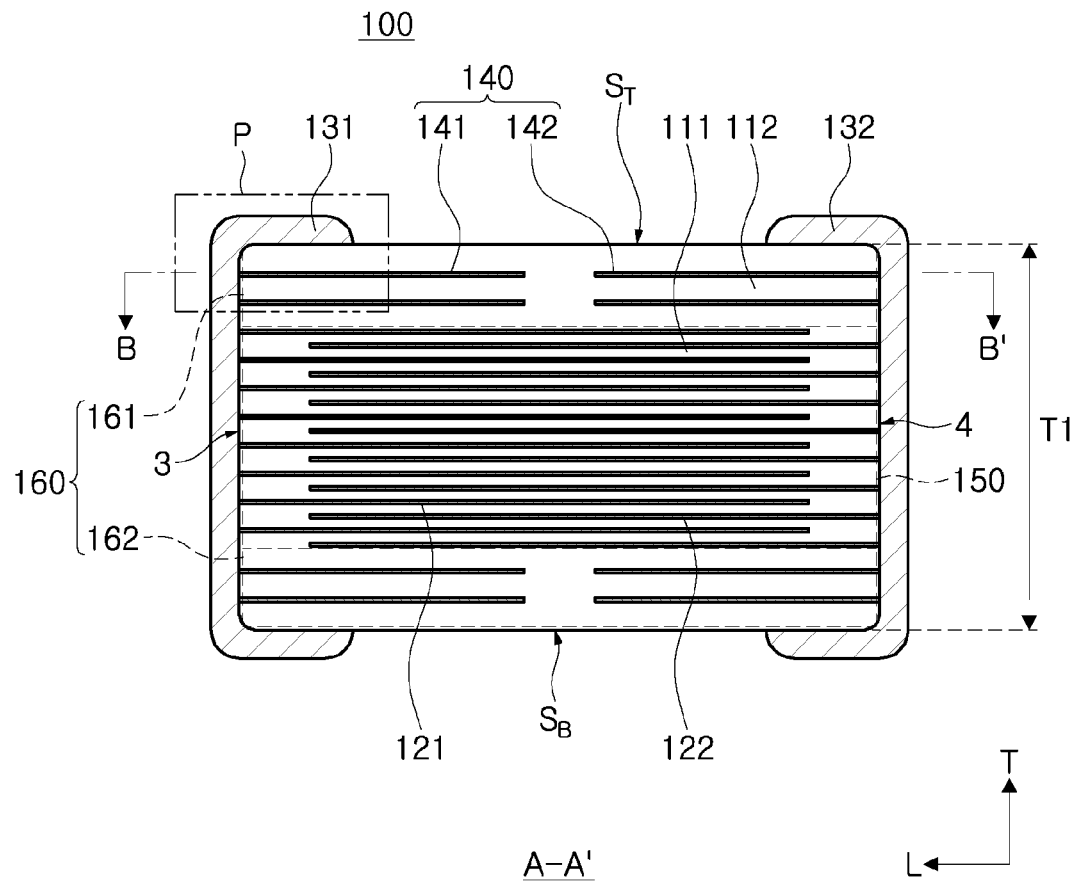
FIG. 2 is a cross-sectional view taken along line A-A' of FIG. 1.

FIG. 1 is a perspective view schematically showing a multilayer ceramic electronic component according to an exemplary embodiment of the present disclosure, and FIG. 2 is a cross-sectional view taken along line A-A' of FIG. 1.

Referring to FIG. 1, a multilayer ceramic electronic component 100 according to an exemplary embodiment of the present disclosure may include a ceramic body 110; and external electrodes 131 and 132.

According to an exemplary embodiment of the present disclosure, a T-direction shown in FIGS. 1 and 2 refers to a thickness direction of the ceramic body 110, an L-direction refers to a length direction of the ceramic body 110, and a W-direction refers to a width direction of the ceramic body 110.

The thickness (T) direction refers to a direction in which internal electrodes and dielectric layers are stacked.

Referring to FIGS. 1 and 2, the ceramic body 110 may have upper and lower surfaces $S_T$ and $S_B$ opposing each other in the thickness direction, first and second side surfaces 1 and 2 opposing each other in the width direction, and third and fourth end surfaces 3 and 4 opposing each other in the length direction. A shape of the ceramic body 110 is not particularly limited. For example, the ceramic body 110 does not have a perfect hexahedral shape but may have a substantially hexahedral shape.

The ceramic body 110 may include a plurality of dielectric layers 111 and internal electrodes 121 and 122.

The ceramic body may include the internal electrodes 121 and 122 formed on the respective dielectric layers 111, and have an active part 150 in which the plurality of dielectric layers including the internal electrodes formed thereon are stacked and a cover part 160 disposed on upper and lower portions of the active part.

Unless particularly described, the upper and lower portions, and the upper and lower surfaces are not separately distinguished from each other in the ceramic body, but may be considered as one portion and the other portion in the thickness direction, and one surface and the other surface opposing each other in the thickness direction, respectively. In addition, the upper and lower surfaces may be considered as first and second main surfaces of the ceramic body opposing each other in the thickness direction, respectively.

The internal electrodes may include first and second internal electrodes 121 and 122. The first and second internal electrodes 121 and 122 may be alternately disposed on each of the dielectric layers 111 interposed therebetween.

The first internal electrode 121 may be exposed to the third end surface 3 of the ceramic body, and the second internal electrode 122 may be exposed to the fourth end surface 4 of the ceramic body.

The external electrodes 131 and 132 may be disposed on the third and fourth end surfaces 3 and 4 of the ceramic body to be connected to the first and second internal electrodes 121 and 122. The external electrodes 131 and 132 may include first and second external electrodes 131 and 132, the first external electrode 131 may be connected to the first internal electrode 121, and the second external electrode 132 may be connected to the second internal electrode 122.

The external electrodes may be formed by applying and sintering a conductive paste to the third and fourth end surfaces of the ceramic body, and a shape and a formation method of the external electrodes are not particularly limited.

According to an exemplary embodiment of the present disclosure, as shown in FIG. 2, the dielectric layers 111 and the internal electrodes 121 and 122 may be stacked in the thickness (T) direction of the ceramic body.

The cover part 160 may be disposed outwardly of outermost internal electrodes in order to protect the active part 150 from external impacts. The cover part 160 may include an upper cover part 161 disposed on the upper portion of the active part 150 and a lower cover part 162 disposed on the lower portion of the active part 150.

According to an exemplary embodiment of the present disclosure, the upper and lower cover parts 161 and 162 may include a dummy electrode 140 disposed therein. The dummy electrode 140 may be a portion from which residual carbon may be discharged (hereinafter, referred to as a residual carbon discharging portion).

In the case in which the internal electrodes and the dielectric layers are thinned, a thickness of the active part may be decreased, while thicknesses of the cover parts may be increased.

In the case in which the internal electrodes are thinned, a ratio of the internal electrodes formed using a metal as a main ingredient may be decreased, such that a manufacturing cost of the multilayer ceramic electronic component may be decreased. However, in the case in which the thicknesses of the cover parts are increased, a carbon component that needs to be removed in a sintering process of the ceramic body may not be removed and may remain in the ceramic body, such that it may be difficult to remove residual carbon.

The ceramic body 110 may be formed by sintering a green sheet multilayer body formed by stacking green sheets on which an internal electrode paste is printed and green sheets on which the internal electrode paste is not printed. The green sheets on which the internal electrode paste is printed may form the active part 150, and the green sheets on which the internal electrode paste is not printed may form the cover part 160. The green sheets may contain a dielectric powder for configuring the ceramic body and a binder binding dielectric powder particles, and further contain a solvent, another additive, and the like, in addition thereto. The binder may contain a resin composition such as an epoxy resin. The binder or another organic ingredient containing carbon, which is an ingredient needs to be removed at the time of sintering the green sheet multilayer body, may be bound to oxygen during a sintering process to thereby be discharged to the outside in a form of carbon dioxide ($CO_2$), or the like.

In the case in which the organic ingredient is not removed during a process of sintering the green sheet multilayer body to form the ceramic body and thus a residual carbon content in the ceramic body is high, breakdown voltage characteristics of the multilayer ceramic electronic component may be deteriorated, and in the case in which a discharge path of the organic ingredient containing carbon is not secured, cracks may be generated in the ceramic body, or a chip bursting defect that the ceramic body is burst may occur. During the sintering process of the green sheet multilayer body, the internal electrode of the green sheet multilayer body may serve as a main path for discharging the organic ingredient. For example, the internal electrodes of the green sheet multilayer body may be a path through which oxygen is supplied into the green sheet multilayer body and may also be a path through which carbon bound to oxygen is discharged in the form of carbon dioxide ($CO_2$).

However, since the internal electrode is not disposed in the cover part 160, limitations in which the supplying of oxygen and the discharging of oxidized and decomposed organic ingredients may not be smoothly performed. Such limitations may be intensified in the case in which the thickness of the cover part 160 is increased due to thinness of the internal electrode.

In the multilayer ceramic electronic component according to an exemplary embodiment of the present disclosure, the cover part 160 may include the dummy electrode 140. Thus, even in a case in which the thickness of the cover part 160 is increased, the organic ingredient in the ceramic body may be efficiently removed, such that an amount of residual carbon in the ceramic body may be decreased.

Each of the upper and lower cover parts 161 and 162 may include at least one dummy electrode 140 formed as a layer having a gap in a central portion thereof. For example, each of the upper and lower cover parts may include a single dummy electrode formed as a layer having the gap in the central portion thereof. Alternatively, each of the upper and lower cover parts may include two or more of the dummy electrodes formed as layers having gaps in the central portions thereof.

For example, each of the upper and lower cover parts 161 and 162 may include two layers or more of first dummy electrodes 141 and two layers or more of second dummy electrodes 142.

The dummy electrode 140 may be disposed in each of the upper and lower cover parts 161 and 162 and have a gap formed in a central portion in the length direction. Based on the gap, the dummy electrode 140 may be divided into the first dummy electrode 141 disposed between one end surface of the cover part in the length direction and the gap and the second dummy electrode 142 disposed between the other end surface of the cover part in the length direction and the gap.

One end of the first dummy electrode 141 may be exposed to the third end surface 3 of the ceramic body, and one end of the second dummy electrode 142 may be exposed to the fourth end surface 4 of the ceramic body. The first and second dummy electrodes 141 and 142 may be exposed to the third and fourth end surfaces 3 and 4 of the ceramic body, respectively, to thereby be connected to the external electrodes.

The gap may allow the first and second dummy electrodes 141 and 142 not to be connected to each other to thereby prevent an electrical short-circuit (short) from being generated between the first and second external electrodes.

Figure 3:
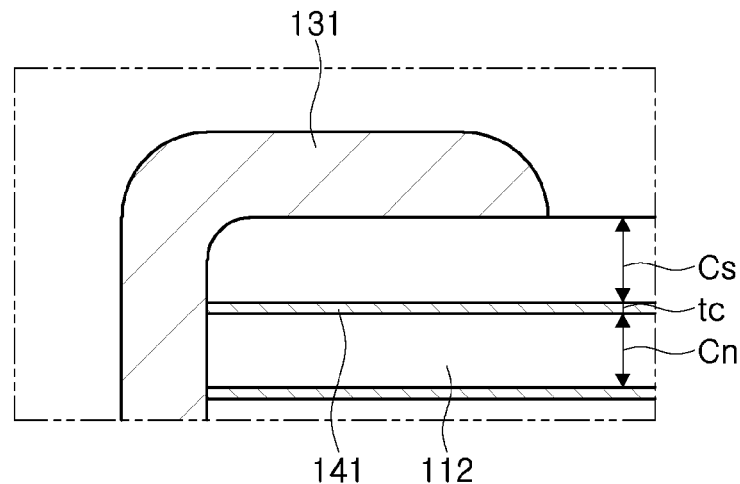
FIG. 3 is an enlarged view of part P of FIG. 2.

FIG. 3 is an enlarged view of part P of FIG. 2.

According to an exemplary embodiment of the present disclosure, when a distance from an uppermost dummy electrode 140 of the upper cover part 161 among the dummy electrodes to the upper surface $S_T$ of the ceramic body or a distance from a lowermost dummy electrode 140 of the lower cover part 162 among the dummy electrodes to the lower surface $S_B$ of the ceramic body is defined as Cs, and a thickness of the ceramic body 110 is defined as T1, Cs/T1 may satisfy the following Equation: $0.03 \leq Cs/T1 \leq 0.15$.

According to an exemplary embodiment of the present disclosure, each of the upper and lower cover parts 161 and 162 may include two layer or more of the first and second dummy electrodes 141 and 142, and when an interval between the first and second dummy electrodes is defined as Cn, and the thickness of the ceramic body 110 is defined as T1, Cn/T1 may satisfy the following Equation: $0.03 \leq Cn/T1 \leq 0.15$.

Hereinafter, Cs and Cn may be collectively referred as C. C/T1 may be considered as Cs/T1 or Cn/T1. C may refer to an interval between the dummy electrodes adjacent to each other in the thickness direction or a distance from the outermost dummy electrode in the thickness direction to the upper or lower surface of the ceramic body adjacent thereto.

In the case in which C/T1 is less than 0.03, delamination may occur in a region in which the dummy electrode is disposed, and in the case in which C/T1 is greater than 0.15, it may be difficult to remove residual carbon from the ceramic body, such that breakdown voltage characteristics may be deteriorated.

A thickness tc of the first and second dummy electrodes 141 and 142 may be 0.3 μm or more. In the case in which the thickness of the first and second dummy electrodes is 0.3 μm or more, a function thereof as a residual carbon removal path may be improved.

Figure 4:
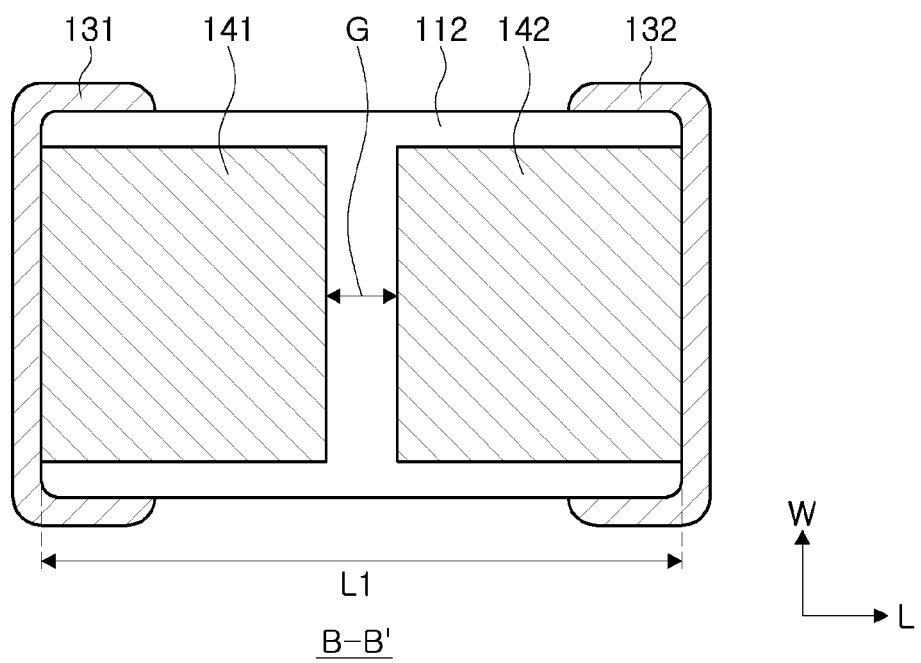
FIG. 4 is a cross-sectional view of the multilayer ceramic electronic component taken along line B-B' of FIG. 2.

FIG. 4 is a cross-sectional view of the multilayer ceramic electronic component taken along line B-B' of FIG. 2.

According to an exemplary embodiment of the present disclosure, when a length of the ceramic body 110 is defined as L1, and a length of the gap between the first and second dummy electrodes 141 and 142 is defined as G, G/L1 may satisfy the following Equation: $0.01 \leq G/L1 \leq 0.2$. The length of the ceramic body 110 may refer to a distance between the third and fourth end surfaces 3 and 4 of the ceramic body, and the length of the gap between the first and second dummy electrodes 141 and 142 may refer to a distance between end portions of the first and second dummy electrodes adjacent to each other. The length of the gap between the first and second dummy electrodes may be considered as a spaced interval between the first and second dummy electrodes.

In the case in which G/L1 is less than 0.01, reliability may be deteriorated due to the dummy electrode, and an electrical short-circuit (short) may be generated. Further, in the case in which G/L1 is greater than 0.2, the residual carbon of the cover part may not be smoothly removed from a region corresponding to the gap of the dummy electrode, such that the breakdown voltage characteristics may be deteriorated.

According to an exemplary embodiment of the present disclosure, the first and second dummy electrodes 141 and 142 may have shapes substantially symmetrical to each other in the length direction of the ceramic body 110.

The first and second dummy electrodes 141 and 142 may be disposed on the same dielectric layer as each other in the cover part 160.

EXPERIMENTAL EXAMPLE

Multilayer ceramic electronic components according to Inventive Examples and Comparative Examples were manufactured as follows.

Slurry containing powder such as barium titanate (BaTiO$_3$), or the like, was applied to carrier films and dried thereon to prepare a plurality of ceramic green sheets.

Then, a conductive paste for an internal electrode containing nickel was applied on some of the ceramic green sheets by a screen printing method to form internal electrode patterns.

In addition, a dummy electrode pattern was formed on the ceramic green sheet on which the internal electrode pattern was not printed. A length G of a gap in a central portion of a dummy electrode was adjusted at the time of printing the dummy electrode pattern, and an interval between the dummy electrodes in a thickness direction or a distance C from an outermost dummy electrode to an upper or lower surface of a ceramic body was adjusted by adjusting a thickness or the number of ceramic green sheet on which the dummy electrode pattern was printed.

Next, the ceramic green sheets on which the internal electrode was printed and the ceramic green sheet on which the dummy electrode was printed were stacked, and isostatic pressing was performed thereon. A ceramic multilayer body which had been subjected to the isostatic pressing was cut into an individual chip form so that one ends of the internal electrode patterns were alternately exposed through cut surfaces, and then the cut chip was subjected to a debinding process.

Then, the cut chip was sintered, thereby forming the ceramic body. After sintering, the ceramic body had a size of about 1.6 mm×0.8 mm×0.8 mm (length×width×thickness (L×W×T), 1608 size, an error range of ±0.1 mm). In this case, a thickness of an active part was about 0.5 mm, a thickness of each dielectric layer included in the active part was about 1.3 μm, and a thickness of each internal electrode was about 1.0 μm.

In the manufactured ceramic body, thicknesses of upper and lower cover parts were about 0.15 mm, respectively, and a thickness of the dummy electrode was about 1.5 μm. The dummy electrode was composed of a first dummy electrode and a second dummy electrode formed to be spaced apart from the first dummy electrode as in an exemplary embodiment of the present disclosure, and an interval between the adjacent dummy electrodes in a thickness direction and an interval between the first and second dummy electrodes were variously formed as shown in Tables 1 and 2.

In the present Experimental Example, the numbers of stacked first and second dummy electrodes were the same as each other, and a single first dummy electrode and a single second dummy electrode were disposed on the same dielectric layer configuring the cover part as each other.

In the present Experimental Example, the interval between the dummy electrodes in the thickness direction and the distance from the outermost dummy electrode to one surface of the upper and lower surfaces adjacent thereto were substantially equal to each other.

Then, a paste containing a copper powder and a glass frit was applied onto outer surfaces of the ceramic body to which the internal electrodes were exposed, and the applied paste was sintered, thereby forming electrode layers.

Table 1 show results of a cover part delamination generation rate and breakdown voltage characteristics according to the thickness T1 of the ceramic body, the interval Cn between the dummy electrodes in the thickness direction, and the ratio thereof (Cn/T1), and Table 2 show results of an electrical short-circuit generation rate and breakdown voltage characteristics according to the length L1 of the ceramic body, a length G of a gap between the dummy electrodes, and a ratio thereof (G/L1).

In Tables 1 and 2, the breakdown voltage characteristics were obtained by measuring a voltage when leakage current of 10 mA or more was generated in the case of applying a voltage to the multilayer ceramic electronic component while increasing the voltage by 20V per second, as a breakdown voltage (BDV).

TABLE 1

| Sample | Cn | T1 | Cn/T1 | Cover Part Delamination Generation Rate [ea/ea] | BDV [V] | Reference |
|---|---|---|---|---|---|---|
| 1 | 7 | 883 | 0.008 | 62/100 | 117 | Comparative Example |
| 2 | 8 | 772 | 0.010 | 36/100 | 116 | Comparative Example |
| 3 | 17 | 749 | 0.023 | 26/100 | 104 | Comparative Example |
| 4 | 21 | 879 | 0.024 | 25/100 | 102 | Comparative Example |
| 5 | 29 | 768 | 0.038 | 0/100 | 117 | Inventive Example |
| 6 | 50 | 824 | 0.061 | 0/100 | 121 | Inventive Example |
| 7 | 54 | 882 | 0.061 | 0/100 | 114 | Inventive Example |
| 8 | 52 | 848 | 0.061 | 0/100 | 112 | Inventive Example |
| 9 | 50 | 813 | 0.062 | 0/100 | 109 | Inventive Example |
| 10 | 54 | 877 | 0.062 | 0/100 | 116 | Inventive Example |
| 11 | 59 | 883 | 0.067 | 0/100 | 115 | Inventive Example |
| 12 | 60 | 842 | 0.071 | 0/100 | 108 | Inventive Example |
| 13 | 63 | 840 | 0.075 | 0/100 | 109 | Inventive Example |
| 14 | 56 | 702 | 0.080 | 0/100 | 116 | Inventive Example |
| 15 | 65 | 783 | 0.083 | 0/100 | 120 | Inventive Example |
| 16 | 75 | 881 | 0.085 | 0/100 | 120 | Inventive Example |
| 17 | 72 | 749 | 0.096 | 0/100 | 119 | Inventive Example |
| 18 | 83 | 736 | 0.113 | 0/100 | 104 | Inventive Example |
| 19 | 96 | 796 | 0.121 | 0/100 | 122 | Inventive Example |
| 20 | 100 | 789 | 0.127 | 0/100 | 118 | Inventive Example |
| 21 | 113 | 860 | 0.131 | 0/100 | 102 | Inventive Example |
| 22 | 124 | 857 | 0.145 | 0/100 | 105 | Inventive Example |
| 23 | 111 | 760 | 0.146 | 0/100 | 104 | Inventive Example |
| 24 | 125 | 818 | 0.153 | 0/100 | 83 | Comparative Example |
| 25 | 130 | 844 | 0.154 | 0/100 | 72 | Comparative Example |
| 26 | 110 | 704 | 0.156 | 0/100 | 69 | Comparative Example |
| 27 | 129 | 813 | 0.159 | 0/100 | 73 | Comparative Example |
| 28 | 119 | 740 | 0.161 | 0/100 | 65 | Comparative Example |
| 29 | 139 | 860 | 0.162 | 0/100 | 67 | Comparative Example |
| 30 | 127 | 745 | 0.170 | 0/100 | 63 | Comparative Example |
| 31 | 145 | 758 | 0.191 | 0/100 | 69 | Comparative Example |
| 32 | 146 | 719 | 0.203 | 0/100 | 78 | Comparative Example |

Referring to Table 1, it may be confirmed that in the cases of samples 1 to 4 in which Cn/T was less than 0.03, an occurrence frequency of the dummy electrode delamination was high, and in the cases of samples 24 to 32 in which Cn/T was greater than 0.15, the breakdown voltage (BDV) was relatively low.

In Table 1, it may be appreciated that in the case in which Cn/T was in a range of 0.03 to 0.15, dummy electrode delamination did not occur in 100 multilayer ceramic electronic components, and the breakdown voltage (BDV) was relatively high, such that the breakdown voltage characteristics were excellent.

TABLE 2

| Sample | G | L1 | G/L1 | Short-Circuit Generation Rate [ea/ea] | BDV [V] | Reference |
|---|---|---|---|---|---|---|
| 1 | 3 | 1659 | 0.002 | 54/100 | 86 | Comparative Example |
| 2 | 3 | 1570 | 0.002 | 65/100 | 79 | Comparative Example |
| 3 | 4 | 1687 | 0.002 | 39/100 | 102 | Comparative Example |
| 4 | 5 | 1542 | 0.003 | 26/100 | 120 | Comparative Example |
| 5 | 8 | 1617 | 0.005 | 24/100 | 113 | Comparative Example |
| 6 | 10 | 1590 | 0.006 | 19/100 | 118 | Comparative Example |
| 7 | 17 | 1589 | 0.011 | 0/100 | 117 | Inventive Example |
| 8 | 17 | 1571 | 0.011 | 0/100 | 101 | Inventive Example |
| 9 | 19 | 1539 | 0.012 | 0/100 | 109 | Inventive Example |
| 10 | 20 | 1547 | 0.013 | 0/100 | 116 | Inventive Example |
| 11 | 31 | 1523 | 0.020 | 0/100 | 109 | Inventive Example |
| 12 | 46 | 1529 | 0.030 | 0/100 | 125 | Inventive Example |
| 13 | 91 | 1584 | 0.057 | 0/100 | 104 | Inventive Example |
| 14 | 107 | 1660 | 0.064 | 0/100 | 113 | Inventive Example |
| 15 | 111 | 1642 | 0.068 | 0/100 | 112 | Inventive Example |
| 16 | 142 | 1500 | 0.095 | 0/100 | 117 | Inventive Example |
| 17 | 150 | 1543 | 0.097 | 0/100 | 113 | Inventive Example |
| 18 | 155 | 1556 | 0.100 | 0/100 | 117 | Inventive Example |
| 19 | 205 | 1543 | 0.133 | 0/100 | 113 | Inventive Example |
| 20 | 236 | 1562 | 0.151 | 0/100 | 107 | Inventive Example |
| 21 | 266 | 1699 | 0.157 | 0/100 | 106 | Inventive Example |
| 22 | 296 | 1606 | 0.184 | 0/100 | 109 | Inventive |

TABLE 2-continued

| Sample | G | L1 | G/L1 | Short-Circuit Generation Rate [ea/ea] | BDV [V] | Reference |
|---|---|---|---|---|---|---|
| 23 | 299 | 1585 | 0.189 | 0/100 | 106 | Inventive Example |
| 24 | 305 | 1591 | 0.192 | 0/100 | 108 | Inventive Example |
| 25 | 323 | 1642 | 0.197 | 0/100 | 116 | Inventive Example |
| 26 | 347 | 1637 | 0.212 | 0/100 | 89 | Comparative Example |
| 27 | 389 | 1630 | 0.239 | 0/100 | 74 | Comparative Example |
| 28 | 382 | 1597 | 0.239 | 0/100 | 66 | Comparative Example |
| 29 | 449 | 1603 | 0.280 | 0/100 | 77 | Comparative Example |
| 30 | 480 | 1687 | 0.285 | 0/100 | 66 | Comparative Example |
| 31 | 458 | 1604 | 0.286 | 0/100 | 74 | Comparative Example |
| 32 | 470 | 1598 | 0.294 | 0/100 | 80 | Comparative Example |

Referring to Table 2, it may be confirmed that in the cases of samples 1 to 6 in which G/L was less than 0.01, an occurrence frequency of the electrical short-circuit (short) was high, and in the cases of samples 26 to 32 in which G/L was more than 0.2, the breakdown voltage (BDV) was relatively low.

In Table 2, it may be appreciated that in the cases of samples 7 to 25 in which G/L was in a range of 0.01 to 0.2, among 100 multilayer ceramic electronic components, the number of multilayer ceramic electronic component in which the electrical short-circuit was caused was zero, and the breakdown voltage (BDV) was relatively high.

As set forth above, according to exemplary embodiments of the present disclosure, the multilayer ceramic electronic component in which the content of the organic ingredient remaining in the ceramic body is low may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
a ceramic body including an active part in which dielectric layers and internal electrodes are alternately disposed, an upper cover part disposed on an upper portion of the active part, and a lower cover part disposed on a lower portion of the active part;
a first dummy electrode disposed between a central portion of the upper or lower cover part in a length direction and one end surface of the upper or lower cover part in the length direction; and
a second dummy electrode disposed between the central portion of the upper or lower cover part in the length direction and the other end surface of the upper or lower cover part in the length direction, and spaced apart from the first dummy electrode,
wherein $0.01 \leq G/L1 \leq 0.2$, where L1 is a length of the ceramic body, and G is an interval between the first and second dummy electrodes spaced from each other,
a thickness of the first and second dummy electrodes is equal to or greater than 1.5 μm,
the thickness of the first and second dummy electrodes is greater than that of the internal electrodes, and
an interval between the first and second dummy electrodes is greater than that between the internal electrodes.

2. The multilayer ceramic electronic component of claim 1, wherein $0.03 \leq Cs/T1 \leq 0.15$, where Cs is a distance from an uppermost dummy electrode of the upper cover part among the dummy electrodes to an upper surface of the ceramic body, or a distance from a lowermost dummy electrode of the lower cover part among the dummy electrodes to a lower surface of the ceramic body, and T1 is a thickness of the ceramic body.

3. The multilayer ceramic electronic component of claim 1, wherein each of the upper and lower cover parts includes two or more layers of first and second dummy electrodes, and $0.03 \leq Cn/T1 \leq 0.15$, where Cn is an interval of the first and second dummy electrodes, and T1 is a thickness of the ceramic body.

4. The multilayer ceramic electronic component of claim 1, wherein the first and second dummy electrodes have shapes symmetrical to each other.

5. The multilayer ceramic electronic component of claim 1, wherein the first and second dummy electrodes are formed on the same layer as each other.

6. A multilayer ceramic electronic component comprising:
a ceramic body including an active part in which dielectric layers and internal electrodes are alternately disposed, and a cover part disposed on an upper and lower portions of the active part; and
a residual carbon discharging portion disposed in the cover part and including at least one layer of a dummy electrode having a gap formed in a central portion thereof,
wherein $0.03 \leq Cs/T1 \leq 0.15$, where Cs is a distance from an outermost dummy electrode included in the residual carbon discharging portion and an upper or lower surface of the ceramic body, and T1 is a thickness of the ceramic body,
a thickness of the first and second dummy electrodes is equal to or greater than 1.5 μm,
the thickness of the first and second dummy electrodes is greater than that of the internal electrodes, and
an interval between the first and second dummy electrodes is greater than that between the internal electrodes.

7. The multilayer ceramic electronic component of claim 6, wherein the residual carbon discharging portion includes two or more layers of dummy electrodes, and $0.03 \leq Cn/T1 \leq 0.15$, where Cn is an interval between adjacent dummy electrodes in a thickness direction.

8. The multilayer ceramic electronic component of claim 6, wherein the dummy electrode includes first and second dummy electrodes separated from each other by the gap, and the first and second dummy electrodes have shapes symmetrical to each other.

9. The multilayer ceramic electronic component of claim 6, wherein the dummy electrode includes first and second dummy electrodes separated from each other by the gap, the first and second dummy electrodes being formed on the same layer as each other.

10. A multilayer ceramic electronic component comprising:
a ceramic body including an active part in which dielectric layers and internal electrodes are alternately disposed, and a cover part disposed on upper and lower portions of the active part; and
a residual carbon discharging portion disposed in the cover part and including at least one layer of a dummy electrode having a gap formed in a central portion thereof, wherein $0.01 \leq G/L1 \leq 0.2$, where L1 is a length of the ceramic body, and G is a length of the gap, a thickness of the first and second dummy electrodes is equal to or greater than 1.5 μm, the thickness of the first and second dummy electrodes is greater than that of the internal electrodes, and an interval between the first and second dummy electrodes is greater than that between the internal electrodes.

\* \* \* \* \*